United States Patent
Choi et al.

(10) Patent No.: US 10,908,081 B2
(45) Date of Patent: *Feb. 2, 2021

(54) OPTICAL ARTICLE AND OPTICAL FILTER INCLUDING SAME

(71) Applicant: LMS CO., LTD, Pyeongtaek-si (KR)

(72) Inventors: Jeong Og Choi, Seoul (KR); Joon Ho Jung, Hwaseong-si (KR); Seon Ho Yang, Seoul (KR); Jin Ho Jung, Seoul (KR); Joo Young Kim, Suwon-si (KR)

(73) Assignee: LMS CO., LTD, Pyeongtaek-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/495,861

(22) PCT Filed: Apr. 4, 2018

(86) PCT No.: PCT/KR2018/003953
§ 371 (c)(1),
(2) Date: Sep. 20, 2019

(87) PCT Pub. No.: WO2018/190560
PCT Pub. Date: Oct. 18, 2018

(65) Prior Publication Data
US 2020/0072741 A1    Mar. 5, 2020

(30) Foreign Application Priority Data
Apr. 10, 2017 (KR) .................. 10-2017-0046181

(51) Int. Cl.
*G02B 5/20* (2006.01)
*G02B 5/22* (2006.01)
*G01N 21/359* (2014.01)

(52) U.S. Cl.
CPC ........... *G01N 21/359* (2013.01); *G02B 5/208* (2013.01); *G02B 5/223* (2013.01)

(58) Field of Classification Search
CPC ........... C08K 5/01; C08L 101/00; G02B 5/26; G02B 5/208; G02B 5/223; H01L 27/14621; G01N 21/359
See application file for complete search history.

(56) References Cited

U.S. PATENT DOCUMENTS

2014/0091419 A1*    4/2014    Hasegawa ............. G02B 5/282
257/432

FOREIGN PATENT DOCUMENTS

JP        4740631 B2     8/2011
JP     2013-029708 A     2/2013
(Continued)

OTHER PUBLICATIONS

International Search Report dated Jul. 30, 2018, in connection with counterpart International Patent Application No. PCT/KR2018/003953.
(Continued)

*Primary Examiner* — Bijan Ahvazi
(74) *Attorney, Agent, or Firm* — Hauptman Ham, LLP

(57) ABSTRACT

The present invention relates to an optical article and an optical filter including the same. The optical filter: includes an optical article which has at least two absorption peaks, including a first and a second absorption peak, in the wavelength range of 380 nm to 1,200 nm by containing two or more kinds of near-infrared absorbing pigments, and thus shows a high average transmittance of 86% or greater for light having a wavelength in the visible wavelength range; can limit the maximum transmittance of light having a wavelength in the range of 800 nm to 1,100 nm below 0.5%, so as to prevent lens flare; and can reduce assembly defects due to flexure of an optical filter in the process of assembling the optical filter to an image capturing apparatus, thereby improving yield and productivity.

13 Claims, 10 Drawing Sheets

(56) References Cited

FOREIGN PATENT DOCUMENTS

| | | |
|---|---|---|
| JP | 2015-040895 A | 3/2015 |
| KR | 10-2014-0088559 A | 7/2014 |
| WO | 2016-158461 A1 | 10/2016 |

OTHER PUBLICATIONS

Korean Office Action dated Apr. 6, 2018, in connection with counterpart Korean Patent Application No. 10-2017-0046181.

\* cited by examiner

OPTICAL FILTER ACCORDING TO COMPARATIVE
EXAMPLE 4

OPTICAL FILTER ACCORDING TO COMPARATIVE
EXAMPLE 6

OPTICAL ARTICLE AND OPTICAL FILTER INCLUDING SAME

CROSS REFERENCE TO RELATED APPLICATION

This present application is a national stage filing under 35 U.S.C § 371 of PCT Application No. PCT/KR2018/003953 filed on Apr. 4, 2018 which is based upon and claims the benefit of priority to Korean Patent Application No. 10-2017-0046181 filed on Apr. 10, 2017 in the Korean Intellectual Property Office. The disclosures of the above-listed applications are hereby incorporated by reference herein in their entirety.

TECHNICAL FIELD

The present invention relates to an optical article and an optical filter including the same and more particularly to an optical article for suppressing a transmittance of light in a wavelength range of 800 nm to 1,200 nm and an optical filter including the same.

BACKGROUND ART

In order to obtain a natural color image as seen by the human eye, an imaging device employing a solid-state imaging element, such as a complementary metal oxide semiconductor (CMOS) image sensor (CIS), essentially requires an optical part which can approximate human vision by blocking light in the near-infrared region of 800 nm to 1,000 nm detected by a sensor and transmitting light in the range of 400 nm to 600 nm.

As such a conventional optical part, there is a reflective near-infrared blocking filter fabricated by depositing a dielectric multilayer film on both surfaces of a general optical glass or an absorbing near-infrared blocking filter fabricated by depositing a dielectric multiplayer film on both surfaces of a fluorophosphate-based glass containing divalent copper ions as a coloring component. However, a conventionally used reflective near-infrared blocking filter has a limit in that it cannot be applied to a high-resolution camera module with five or more mega pixels because a ghost phenomenon of taking an unintended image is severe due to internal reflection between an optical filter and a microlens of a CIS when an image is taken by an imaging device. Also, a conventional absorbing near-infrared blocking filter has a favorable effect of blocking wavelengths ranging from 800 nm to 1,200 nm. However, due to low durability resulting from the properties of a material, it is difficult to fabricate a thin absorbing near-infrared blocking filter, and the fabricated filter is fragile.

Consequently, there is an urgent demand to develop an optical part which can block light having a wavelength range of 800 nm to 1,200 nm and which can be fabricated to be thinner.

DISCLOSURE

Technical Problem

The present invention is directed to providing an optical article which shows high transmittance for light having a wavelength in the visible light region, provides high resolution power even in an imaging environment with low illumination by selectively and/or effectively blocking light in the wavelength range of 800 nm to 1,200 nm, prevents lens flare, and is appropriate for a high-resolution imaging device because it is easy to fabricate the optical article to be thinner.

The present invention is also directed to providing an optical filter including the optical article.

The present invention is also directed to providing an imaging device including the optical filter.

Technical Solution

To achieve the aforementioned objectives,
one aspect of the present invention provides an optical article comprising:

a transparent base containing two or more kinds of near-infrared absorbing pigments;

an absorbance spectrum measured using a spectrophotometer in a wavelength range of 380 nm to 1,200 nm has two or more absorption peaks including first and second absorption peaks, wherein the first absorption peak has an absorption maximum λmax1 in a wavelength range of 650 nm to 750 nm, wherein the second absorption peak has an absorption maximum λmax2 in a wavelength range of 980 nm to 1,200 nm; and when an optical density (OD) value OD1 at the absorption maximum of the first absorption peak is normalized to 1, an OD value OD2 at the absorption maximum of the second absorption peak satisfies Expression 1 below:

$$0.08 \leq OD2 \leq 0.25. \qquad \text{[Expression 1]}$$

Another aspect of the present invention provides an optical filter including the optical article.

Advantageous Effects

An optical filter according to the present invention includes an optical article which contains two or more kinds of near-infrared absorbing pigment and thus has two or more absorption peaks including first and second absorption peaks in a wavelength range of 380 nm to 1,200 nm. Therefore, the optical filter shows high transmittance for light having a wavelength in the visible light region and prevents lens flare by suppressing a transmittance for light having a wavelength range of 800 nm to 1,100 nm to 0.5% or less. Also, it is easy to manufacture a thinner imaging device, and the production cost is reduced due to increased yield and productivity of the assembly process.

A and B: specimens bent in (−) direction, C: a specimen bent in (+) direction, (a): a horizontal surface, (b): a specimen, (c): the degree of warpage, (d): an intermediate plane, (e): a plane including the end of a specimen, and (f) and (g): points at which the degree of warpage is the greatest in the inner surface of a specimen.

Figure 4:
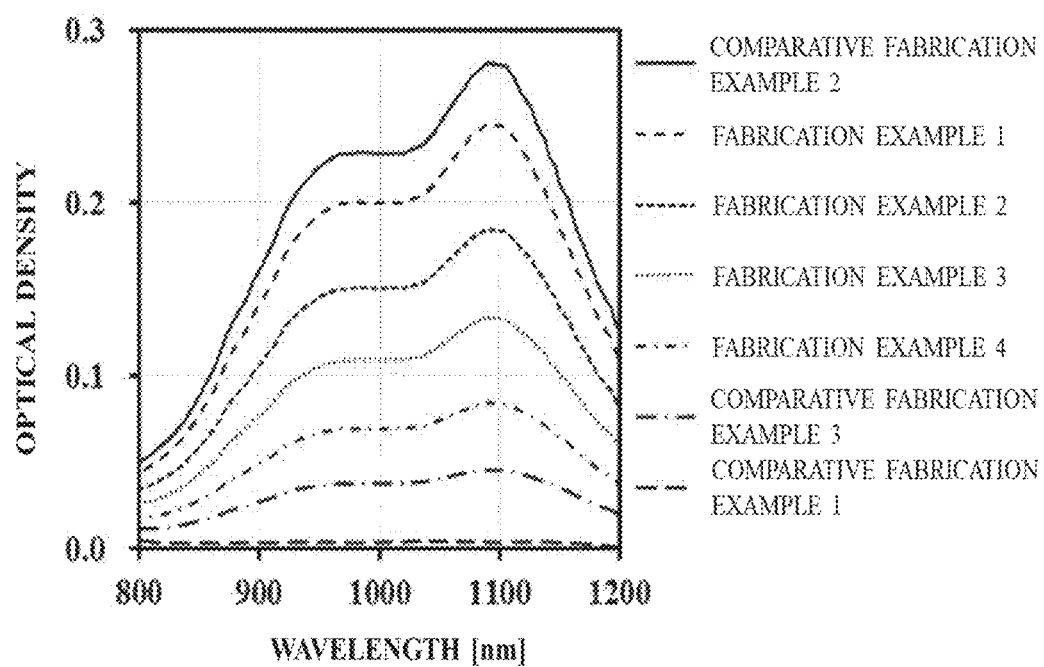

FIG. 4 is a graph showing a normalized optical density (OD) curve of each optical article depending on the content of an infrared absorbing pigment according to an embodiment of the present invention.

Figure 5:
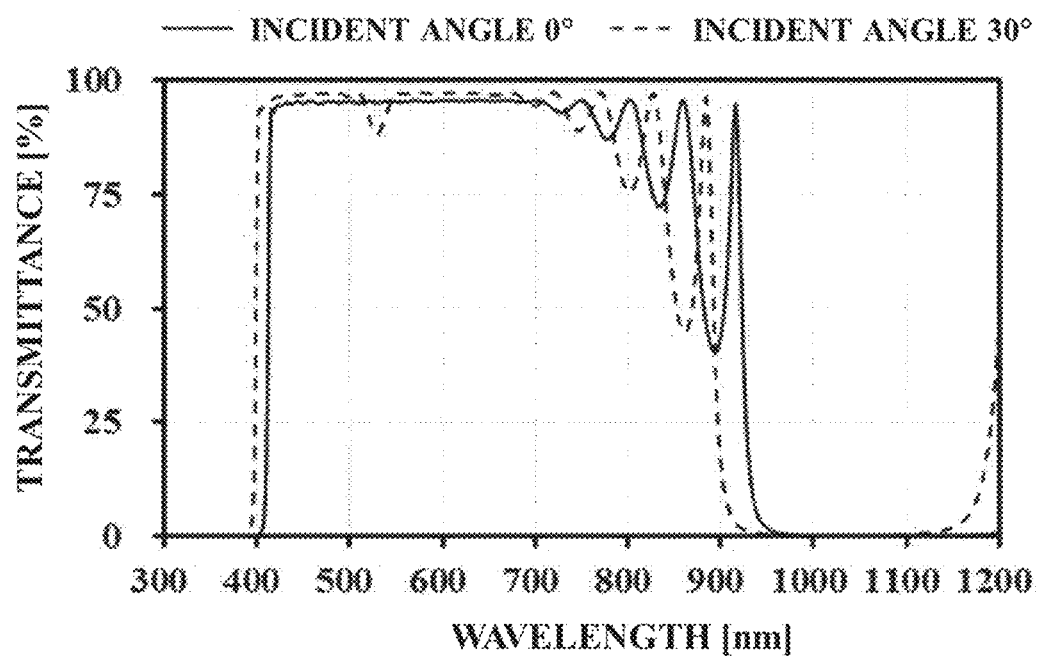
Figure 6:
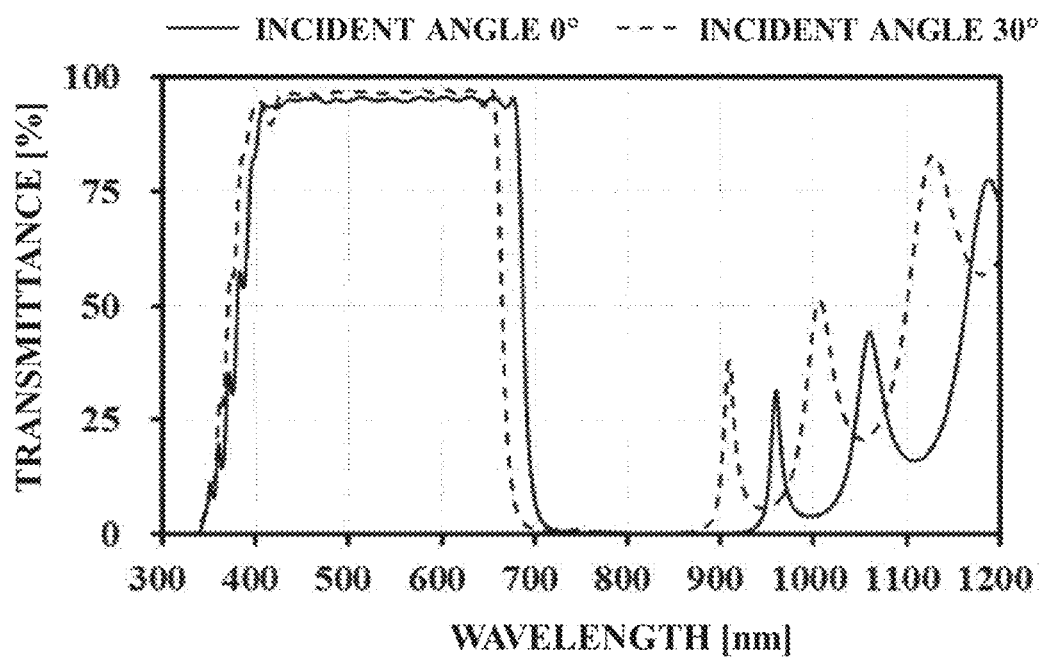
Figure 7:
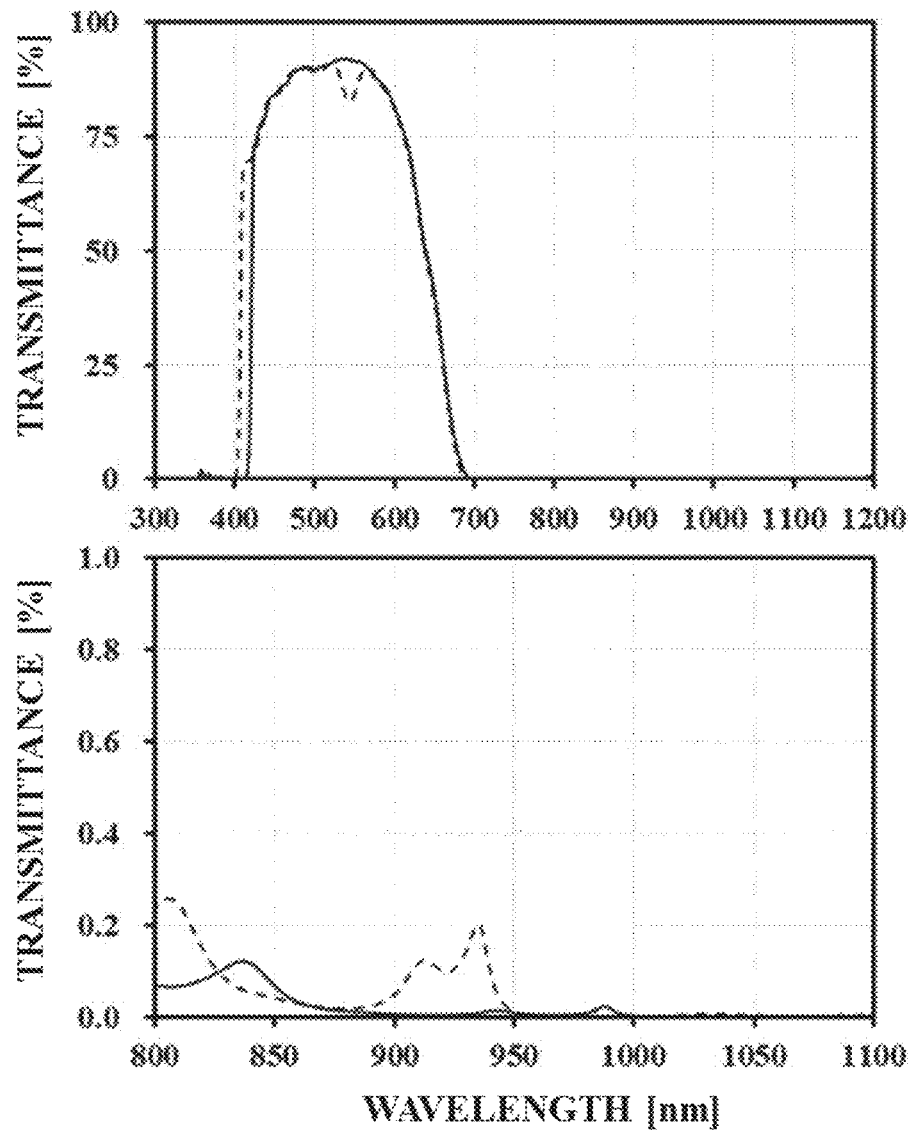
Figure 8:
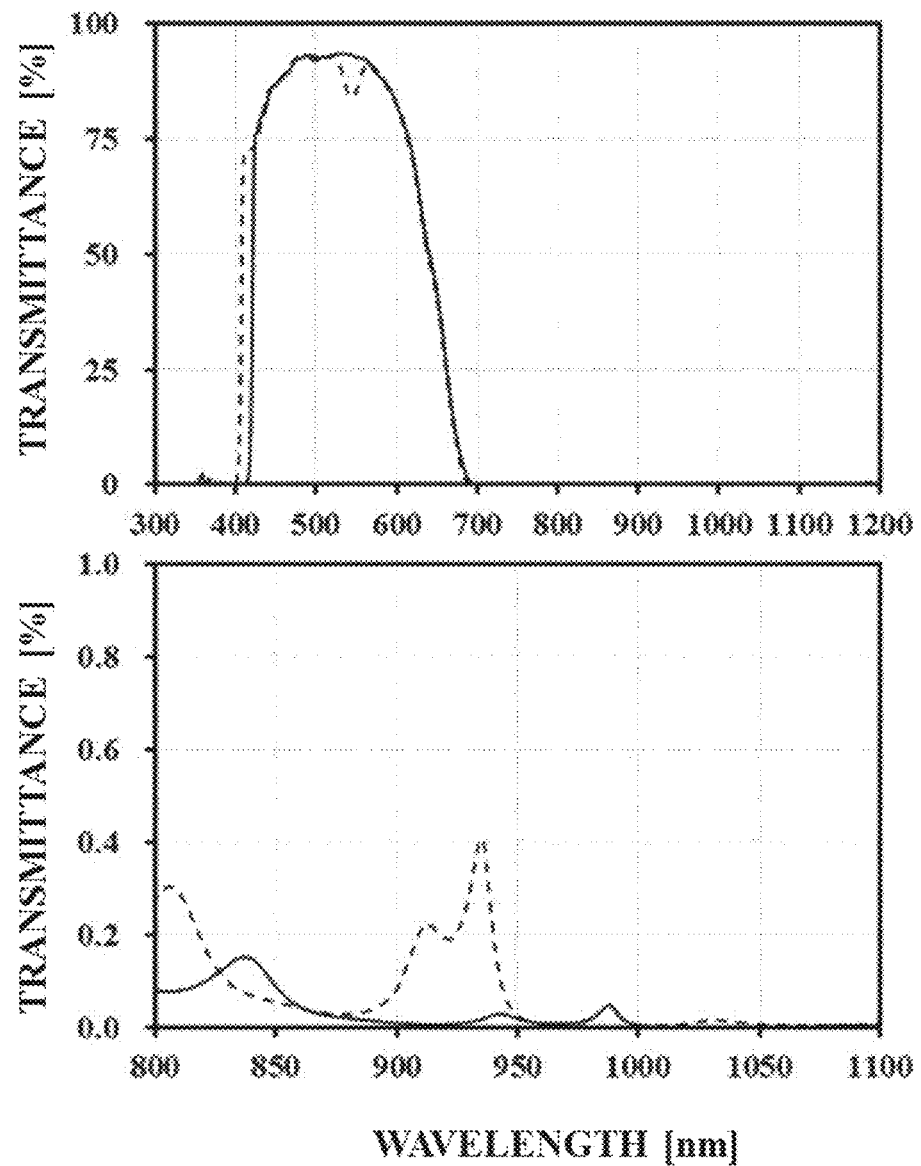
Figure 9:
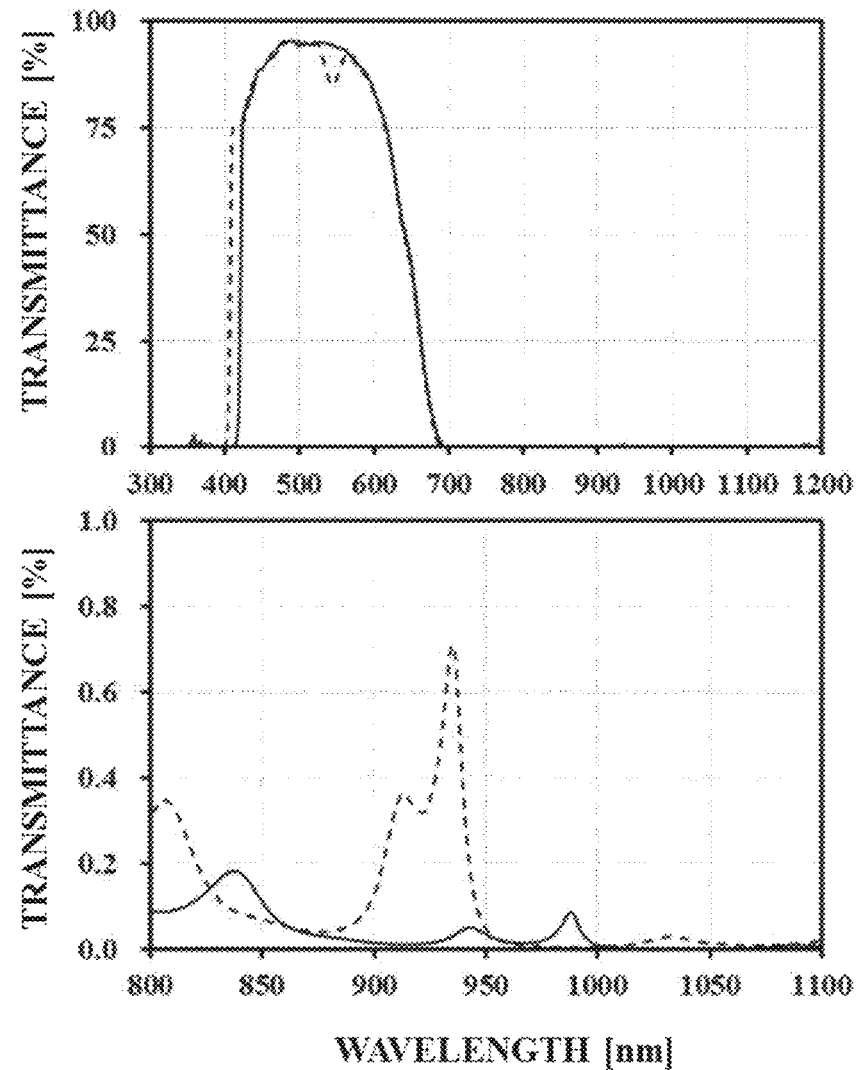
Figure 10:
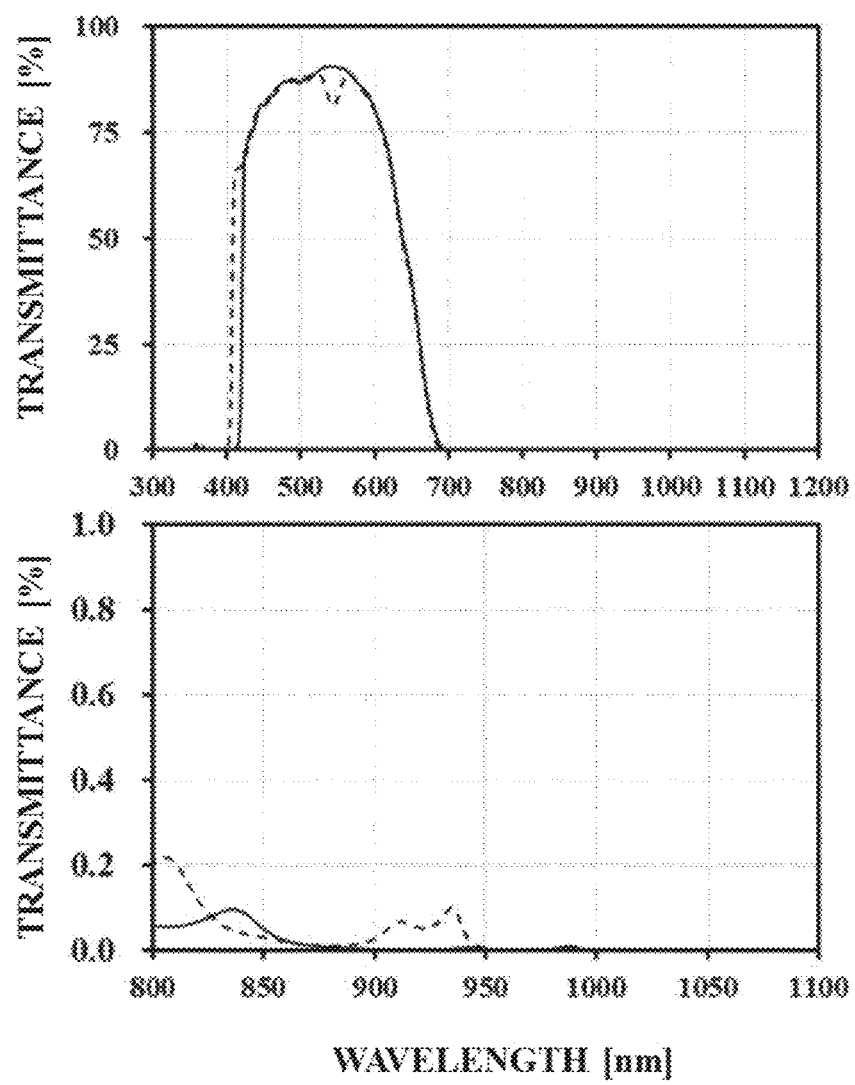

FIGS. 5 and 6 are graphs respectively showing spectral transmittances of first and second selective wavelength reflection layers according to an embodiment of the present invention.

FIGS. 7 to 10 are graphs showing spectral transmittances of optical filters, which were fabricated according to Example 5, Example 7, Comparative Example 4, and Comparative Example 5 of the present invention, measured in a wavelength range of 300 nm to 1,200 nm.

FIG. 11A to FIG. 11D is a set of images captured by an imaging device equipped with optical filters according to Example 5, Example 7, Comparative Example 4, and Comparative Example 6 of the present invention.

MODES OF THE INVENTION

Since the present invention can be modified variously and can have various embodiments, specific embodiments will be illustrated in the drawings and described in detail.

However, the present invention is not limited to the specific embodiments and should be construed as encompassing all the changes, equivalents, and substitutions included in the spirit and technical scope of the present invention.

In the present invention, it should be understood that terms such as "include," "have," and "configure," are intended to indicate the presence of features, numbers, steps, operations, components, parts, or combinations thereof stated herein and do not preclude the probability of presence or addition of one or more other features, numbers, steps, operations, components, parts, or combinations thereof.

Also, it should be understood that the drawings appended to the present invention are exaggerated or scaled down for convenience of description.

Hereinafter, the present invention will be described in detail with reference to the drawings. Regardless of reference signs, identical or corresponding elements have the same reference numbers, and description thereof will not be reiterated.

In the present invention, "visible light" is light in a wavelength region that can be sensed by the human eye among electromagnetic waves and refers to light in a wavelength range of 380 nm to 650 nm.

Also, in the present invention, "near-infrared light" is light which is positioned farther out than the end of red light and has a longer wavelength than visible light and refers to light in a wavelength range of 650 nm to 3 μm. In the present invention, the degree of blocking the "near-infrared light" may be represented by the optical density (OD) for near-infrared light. Assuming that when the light travels through a light-absorbing medium, the intensity of incident light is Io and the intensity of passing light is I, the OD is defined as the common logarithm of Io/I. In other words, an OD is a value represented by "OD=log(Io/I)." The OD may be calculated using a spectrophotometry.

In the present invention, an "absorption maximum" is a wavelength at which an OD is maximized in a light-absorbing wavelength range, that is, an absorbing band.

Figure 3A:
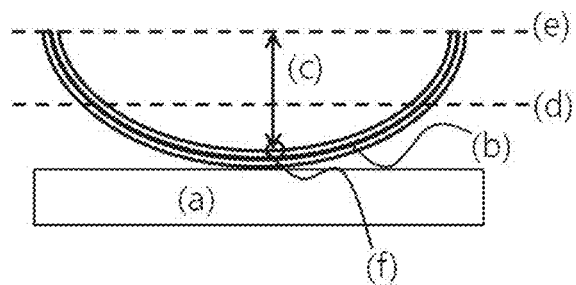
FIG. 3A to FIG. 3C is a set of cross-sectional views showing bent optical filters, in which A to C and (a) to (g) are as follows.
Figure 3B:
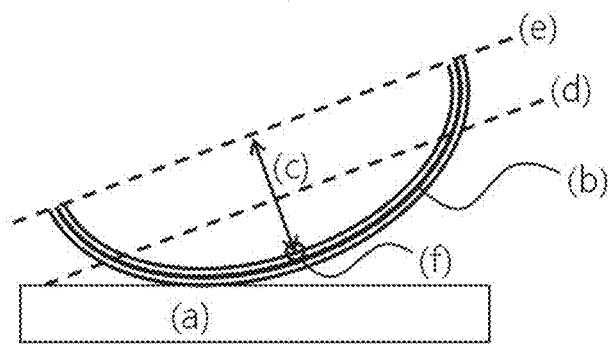

In the present invention, the "degree of warpage" is a measure of the degree to which an optical filter is bent and, as shown in FIGS. 3A and 3B, refers to the height of a highest point (f) based on a plane (e) formed by rectilinearly connecting ends of the specimen (b) among heights of arbitrary points present on an inner surface of a specimen (b). Here, the "inner surface of the specimen" refers to the surface with the shorter length of the both surfaces of the specimen which is bent, and the opposite surface is referred to as the "outer surface of the specimen." The greater the height, the higher the degree (c) of warpage of the specimen (b) is.

Figure 3C:
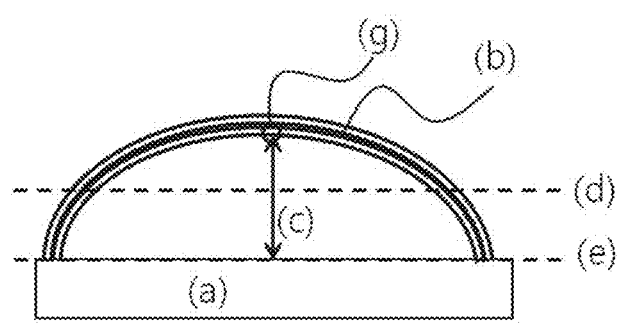

In the present invention, a "warpage direction" refers to a direction in which an optical filter is bent and may be represented as a (+) or (−) direction. Specifically, as shown in FIGS. 3A and 3B, when the point (f) having the greatest degree of warpage (c) on the inner surface of the specimen (b) on the basis of the plane (e) formed by rectilinearly connecting the ends of the specimen (b) is present between a horizontal surface (a) and an intermediate plane (d), the warpage of the specimen (b) may be considered to have the (−) direction. On the contrary, as shown in FIG. 3C, when a point (g) having the greatest degree of warpage (c) on the inner surface of the specimen (b) on the basis of the plane (e) formed by rectilinearly connecting the ends of the specimen (b) is not present between the horizontal surface (a) and the intermediate plane (d), the warpage of the specimen (b) may be considered to have the (+) direction.

The "intermediate plane (d)" is a plane present between the point (f or g) having the greatest degree of warpage (c) on the inner surface of the specimen (b) and the plane (e) formed by rectilinearly connecting the ends of the specimen (b) and refers to a plane parallel to the plane (e) at half the height of the point (for g).

The "horizontal surface (a)" is a plane supporting a specimen while the degree of warpage of the specimen (b) is measured and may include a specimen-mounting surface of a three-dimensional (3D) surface measuring device, such as an ultra-accuracy 3D profilometer, and the like.

Further, in the present invention, an "alkyl group" refers to a substituent derived from a linear or branched saturated hydrocarbon.

The "alkyl group" may be, for example, a methyl group, an ethyl group, an n-propyl group, an iso-propyl group, an n-butyl group, a sec-butyl group, a tert-butyl group, an n-pentyl group, a 1,1-dimethylpropyl group, a 1,2-dimethylpropyl group, a 2,2-dimethylpropyl group, a 1-ethylpropyl group, a 2-ethylpropyl group, an n-hexyl group, a 1-methyl-2-ethylpropyl group, a 1-ethyl-2-methylpropyl group, a 1,1,2-trimethylpropyl group, a 1-propylpropyl group, a 1-methylbutyl group, a 2-methylbutyl group, a 1,1-dimethylbutyl group, a 1,2-dimethylbutyl group, a 2,2-dimethylbutyl group, a 1,3-dimethylbutyl group, a 2,3-dimethylbutyl group, a 2-ethylbutyl group, a 2-methylpentyl group, a 3-methylpentyl group, or the like.

In the present invention, the "alkyl group" may have 1 to 20 carbon atoms, for example, 1 to 12 carbon atoms, 1 to 6 carbon atoms, or 1 to 4 carbon atoms.

Also, in the present invention, a "cycloalkyl group" refers to a substituent derived from a monocyclic saturated hydrocarbon.

The "cycloalkyl group" may be, for example, a cyclopropyl group, a cyclobutyl group, a cyclopentyl group, a cyclohexyl group, a cycloheptyl group, a cyclooctyl group, or the like.

The "cycloalkyl group" may have 3 to 20 carbon atoms, for example, 3 to 12 carbon atoms or 3 to 6 carbon atoms.

Further, in the present invention, an "aryl group" refers to an univalent substituent derived from an aromatic hydrocarbon.

The "aryl group" may be, for example, a phenyl group, a naphthyl group, an anthracenyl group, a phenanthryl group, a naphthacenyl group, a pyrenyl group, a tolyl group, a biphenyl group, a terphenyl group, a chrycenyl group, a spirobifluorenyl group, a fluoranthenyl group, a fluorenyl group, a perylenyl group, an indenyl group, an azulenyl group, a heptalenyl group, a phenalenyl group, a phenanthrenyl group, or the like.

The "aryl group" may have 6 to 30 carbon atoms, for example, 6 to 10 carbon atoms, 6 to 14 carbon atoms, 6 to 18 carbon atoms, or 6 to 12 carbon atoms.

Moreover, in the present invention, a "heteroaryl group" refers to an "aromatic heterocyclic group" or a "heterocyclic group" derived from a single ring or a condensed ring. The "heteroaryl group" may include at least one, for example, 1, 2, 3, or 4, selected from nitrogen (N), sulfur (S), oxygen (O), phosphorus (P), selenium (Se), and silicon (Si) as a heteroatom.

The "heteroaryl group" may be, for example, a nitrogen-containing heteroaryl group including a pyrrolyl group, a pyridyl group, a pyridinyl group, a pyridazinyl group, a pyrimidinyl group, a pyrazinyl group, a triazolyl group, a tetrazolyl group, a benzotriazolyl group, a pyrazolyl group, an imidazolyl group, a benzimidazolyl group, an indolyl group, an indolinyl group, an isoindolyl group, an indolizinyl group, a purinyl group, an indazolyl group, a quinolyl group, an isoquinolinyl group, a quinolizinyl group, a phthalazinyl group, a naphthylidinyl group, a quinoxalinyl group, a quinazolinyl group, a cinnolinyl group, a pteridinyl group, an imidazotriazinyl group, an acridinyl group, a phenanthridinyl group, a carbazolyl group, a carbazolinyl group, a pyrimidinyl group, a phenanthrolinyl group, a phenazinyl group, an imidazopyridinyl group, an imidazopyrimidinyl group, a pyrazolopyridinyl group, etc., a sulfur-containing heteroaryl group including a thienyl group, a benzothienyl group, a dibenzothienyl group, etc., an oxygen-containing heteroaryl group including a furyl group, a pyranyl group, a cyclopentapyranyl group, a benzofuranyl group, an isobenzofuranyl group, a dibenzofuranyl group, a benzodioxole group, a benzotrioxole group, and the like.

Specific examples of the "heteroaryl group" may be compounds including at least two heteroatoms selected from a thiazolyl group, an isothiazolyl group, a bezothiazolyl group, a benzothiadiazolyl group, a phenothiazinyl group, an isoxazolyl group, a furazanyl group, a phenoxazinyl group, an oxazolyl group, a benzoxazolyl group, an oxadizolyl group, a pyrazoloxazolyl group, an imidazothiazolyl group, a thienofuranyl group, a furopyrrolyl group, a pyridoxazinyl group, and the like.

Further, the "heteroaryl group" may have 2 to 20 carbon atoms, for example, 4 to 19 carbon atoms, 4 to 15 carbon atoms, or 5 to 11 carbon atoms. For example, when a heteroatom is included, the heteroaryl group may have 5 to 21 ring members.

In the present invention, an "aralkyl group" refers to a saturated hydrocarbon substituent in which a univalent substituent derived from an aromatic hydrocarbon is bonded to a hydrogen site of a terminal hydrocarbon. That is, the "aralkyl group" is an alkyl group in which an end of the chain is substituted with an aryl group and may be, for example, a benzyl group, a phenethyl group, a phenylpropyl group, a naphthalenylmethyl group, a naphthalenylethyl group, or the like.

In the present invention, an "average transmittance" refers to an arithmetic mean of transmittance on a transmittance curve versus wavelength in a certain wavelength range in the case of measuring a transmission spectrum of an optical article, an optical filter, or the like using a spectrophotometer.

In the present invention, a "maximum transmittance" refers to a maximum of transmittance on a transmittance curve versus wavelength in a certain wavelength range in the case of measuring a transmission spectrum of an optical article, an optical filter, or the like using a spectrophotometer.

In the present invention, an "incident angle" refers to an angle between a light source and a direction which is perpendicular to a main surface of an optical article, an optical filter, or the like in the case of measuring a transmission spectrum or an absorbance spectrum of the optical article, the optical filter, or the like using a spectrophotometer. Unless an incident angle is described, the incident angle is 0°.

Hereinafter, the present invention will be described in detail.

<Optical Article>

An embodiment of the present invention provides, an optical article including a transparent base containing two or more kinds of near-infrared absorbing pigments.

An absorbance spectrum measured using a spectrophotometer in a wavelength range of 380 nm to 1,200 nm has two or more absorption peaks including first and second absorption peaks.

The first absorption peak has an absorption maximum λmax1 in a wavelength range of 650 nm to 750 nm.

The second absorption peak has an absorption maximum λmax2 in a wavelength range of 980 nm to 1,200 nm.

When an OD value OD1 at the absorption maximum of the first absorption peak is normalized to 1, an OD value OD2 at the absorption maximum of the second absorption peak satisfies Expression 1 below:

$$0.08 \leq OD2 \leq 0.25. \qquad \text{[Expression 1]}$$

To obtain a natural color image as seen by the human eye, an imaging device employing a solid-state imaging element essentially requires an optical part which can approximate human vision by blocking light in the near-infrared region of 800 nm to 1,200 nm detected by a sensor and transmitting light in the range of 400 nm to 600 nm corresponding to the visible light region. While imaging devices are rapidly increasing in resolution, reducing in thickness, and increasing in angle of view recently, there is an increasing demand for an optical part for an imaging device which can provide high resolution power even in an imaging environment with low illumination and almost completely suppress image quality degradation, such as color distortion and lens flare, even in natural light or artificial light. The present inventors found that lens flare is intensified in the case of imaging a subject exposed to a light source and lighting (regardless of whether it is natural lighting or artificial lighting), which emit light in a wide wavelength range and emit light in the near-infrared region together or a subject including the light source and light. Also, the present inventors found that it is possible to obtain a clear image without lens flare by applying an optical article which can strictly control light of a specific wavelength region incident on an image sensor to a specific level or lower regardless of incident angle and an optical filter including the optical article to an imaging device. Further, to provide high resolution power even in an imaging environment with low illumination, the present inventors invented an optical article of an optical filter which can also provide high transmittance in the visible light region.

An optical article according to the present invention may include two or more kinds of near-infrared absorbing pigments. Since the optical article includes two or more kinds of near-infrared absorbing pigments, it may show high transmittance for light having a wavelength in the visible light region and suppress transmittance for light having a wavelength range of 800 nm to 1,200 nm.

The optical article may have one or more absorption peaks in each of the wavelength range of 650 nm to 750 nm and the wavelength range of 980 nm to 1,200 nm, and the absorption peaks may include first and second absorption peaks having the absorption maximums λmax1 and λmax2. Also, when the OD value OD1 at the absorption maximum of the first absorption peak is normalized to 1, the OD value OD2 at the absorption maximum of the second absorption peak may be greater than or equal to 0.08 and less than or equal to 0.25. Specifically, Expression 1 may be satisfied when $0.09 \leq OD2 \leq 0.17$, $0.13 \leq OD2 \leq 0.17$, $0.08 \leq OD2 \leq 0.18$, $0.15 \leq OD2 \leq 0.175$, $0.09 \leq OD2 \leq 0.13$, $0.16 \leq OD2 \leq 0.24$, $0.15 \leq OD2 \leq 0.25$, or $0.160D2 \leq 0.235$. Preferably, Expression 1 may be satisfied when the OD value OD2 at the absorption maximum of the second absorption peak is greater than or equal to 0.13 and less than or equal to 0.18. The optical article according to the present invention may include a transparent base, which may have a structure including two or more kinds of near-infrared absorbing pigments for absorbing light in the wavelength range of 600 nm to 1,200 nm.

Figure 1A:
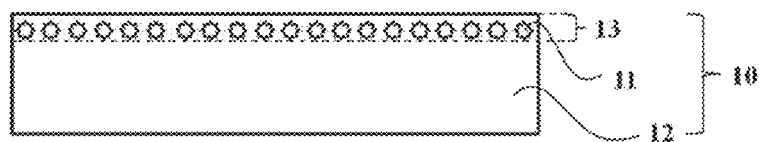
FIG. 1A to FIG. 1C is a set of cross-sectional views of an optical article according to an embodiment of the present invention.
Figure 1B:
Figure 1C:
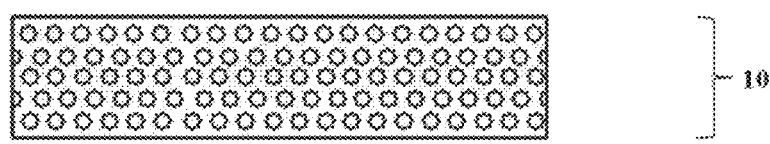

FIG. 1A to FIG. 1C is a set of cross-sectional views showing a structure of an optical article according to the present invention. Referring to FIGS. 1A to 1C, the optical article may include a transparent base 10, which may include near-infrared absorbing pigments 11 and a base layer 12. The near-infrared absorbing pigments 11 may be included in near-infrared absorbing layers 13, 13a, and/or 13b formed on one surface and/or two surfaces of the base layer 12 as shown in FIGS. 1A and 1B or may be included in the base layer 12 in an evenly distributed form as shown in FIG. 1C.

Each element of the transparent base 10 included in the optical article according to the present invention will be described in further detail below.

First, in the transparent base according to the present invention, the base layer 12 serves as a base substrate of the transparent base and an optical filter including the transparent base. Any transparent material can be used for the base layer 12.

Various materials known in the corresponding field can be used for the base layer 12 and may be suitably selected according to a required function, use, and the like. As the base layer 12, for example, one or more selected from glass, a polymer resin, etc. may be used. The polymer resin may be, for example, a polyester-based resin, a polycarbonate-based resin, an acryl-based resin, a polyolefin-based resin, a cyclic olefin-based resin, a polyimide-based resin, a polyamide-based resin, and a polyurethane-based resin, and the resin may be used in the form of a single sheet, a stacked sheet, or a co-extrudate.

In addition, the base layer 12 is formed of a polymer resin according to an exemplary form and may include a polyester-based resin which is advantageous for heat resistance and the like as a base resin. Examples of the polyester-based resin may be one or more selected from the group consisting of polyethylene terephthalate (PET), polyethylene naphthalate (PEN), polybutylene terephthalate (PBT), and the like, but the present invention is not limited thereto. As another example, the base layer 12 may be formed of a polyolefin-based resin, which may be, for example, polypropylene (PP).

In the transparent base according to the present invention, the near-infrared absorbing pigments 11 may be any dye, pigment, and/or metal complex which absorbs light in the wavelength range of 600 nm to 1,200 nm without particular limitation.

As an example, the near-infrared absorbing pigments 11 may include pigments having the absorption maximum in the wavelength range of 650 nm to 750 nm and the wavelength range of 980 nm to 1,200 nm, specifically, first and second pigments respectively having absorption maximums λmax1 and λmax2 in the wavelength range of 650 nm to 750 nm and the wavelength range of 980 nm to 1,200 nm, in the case of measuring an absorbance spectrum using a spectrophotometer in the wavelength range of 380 nm to 1,200 nm.

As described above, when the near-infrared absorbing pigments 11 are included in the near-infrared absorbing layer 13 formed on one surface of the base layer 12 or distributed in the base layer 12, first and second pigments may be evenly mixed together (see FIGS. 1A and 1C). Also, when the near-infrared absorbing pigments 11 are included in the near-infrared absorbing layers 13a and 13b formed on the both surfaces of the base layer 12, the first and second pigments may be separately used in the respective absorbing layers 13a and 13b or may be evenly mixed together and used therein (see FIG. 1B).

The near-infrared absorbing pigments 11 may be, for example, a cyanine-based compound, a phthalocyanine-based compound, a naphthalocyanine-based compound, a porphyrin-based compound, a benzoporphyrin-based compound, a squarylium-based compound, an anthraquinone-based compound, a croconium-based compound, a diimonium-based compound, and a dithiol metal complex. As an example, the near-infrared absorbing pigments 11 may include, as the first and second pigments, one or more selected from compounds represented by the following Formulas 1 and 2:

[Formula 1]

[Formula 2]
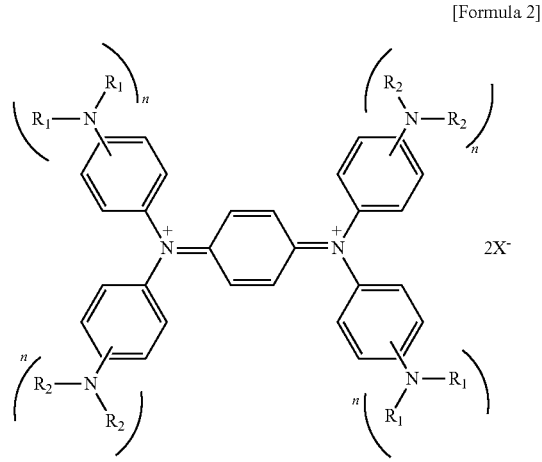

In the above Formulas 1 and 2,

A is an aminophenyl group, an indolylmethylene group, or an indolinyl group, and two As are conjugated with each other with

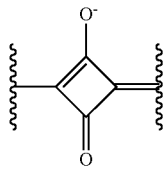 [SMILES: *C1=C([O-])C(=*)C1=O]

at the center thereof.

Any one or more of hydrogens present in the aminophenyl group, indolylmethylene group, or indolinyl group may each independently be hydrogen, a halogen group, a hydroxyl group, a cyano group, a nitro group, a carboxyl group, an alkyl group having 1 to 20 carbon atoms, a cycloalkyl group having 3 to 20 carbon atoms, an alkoxy group having 1 to 10 carbon atoms, an aralkyl group having 7 to 20 carbon atoms, a sulfonamide group, or an amide group unsubstituted or substituted with an alkyl group having 1 to 4 carbon atoms, a haloalkyl group having 1 to 4 carbon atoms, or an aralkyl group having 7 to 20 carbon atoms.

Specifically, Formula 1 may be any one of the compounds represented by Formulas 1A to 1C below.

[Formula 1A]

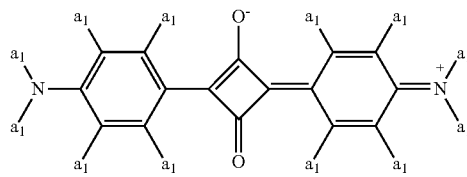

[Formula 1B]

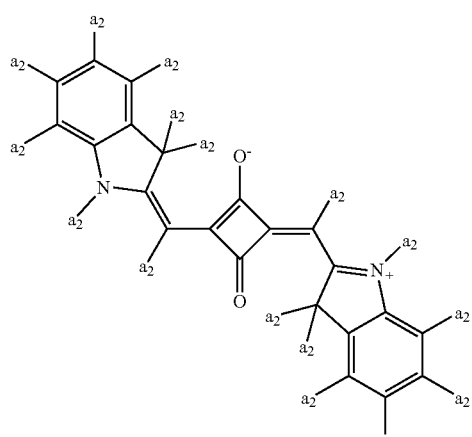

[Formula 1C]

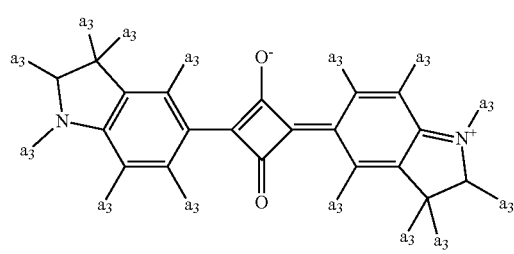

In Formulas 1A to 1C, $a_1$, $a_2$, and $a_3$ are each independently hydrogen, a halogen group, a hydroxyl group, a cyano group, a nitro group, a carboxyl group, an alkyl group having 1 to 10 carbon atoms, a cycloalkyl group having 3 to 10 carbon atoms, an alkoxy group having 1 to 6 carbon atoms, an aralkyl group having 7 to 20 carbon atoms, a sulfonamide group, or an amide group unsubstituted or substituted with an alkyl group having 1 to 4 carbon atoms, a haloalkyl group having 1 to 4 carbon atoms, or an aralkyl group having 7 to 20 carbon atoms $R_1$ and $R_2$ are each independently an alkyl group having 1 to 20 carbon atoms or a cycloalkyl group having 3 to 20 carbon atoms. n is 1 or 2, and X may be perchlorate ($ClO_4^-$), hexafluoroantimonate ($SbF_6^-$), hexafluorophosphate ($PF_6^-$), tetrafluoroborate ($BF_4^-$), or any one of anions represented by the following Formulas 2A to 2C.

[Formula 2A]

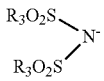

[Formula 2B]

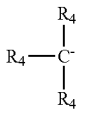

[Formula 2C]

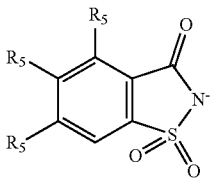

In Formulas 2A to 2C, $R_3$ are each independently a monofluoroalkyl group having 1 to 8 carbon atoms or a trifluoroalkyl group having 1 to 8 carbon atoms, $R_4$ are each independently hydrogen, a nitro group, or a cyano group, and $R_5$ are each independently an alkyl group having 1 to 20 carbon atoms, a monofluoroalkyl group having 1 to 8 carbon atoms, or a trifluoroalkyl group having 1 to 8 carbon atoms.

Further, a content of the near-infrared absorbing pigments 11 may be 1.07 to 1.16 parts by weight, 1.11 to 1.16 parts by weight, 1.07 to 1.21 parts by weight, or 1.11 to 1.21 parts by weight with respect to 100 parts by weight of a resin constituting a matrix of the near-infrared absorbing layer 13, 13a, or 13b.

<Optical Filter>

In addition, an optical filter including the optical article is provided in an embodiment of the present invention.

As an example, the optical filter according to the present invention may include a transparent base containing two or more kinds of near-infrared absorbing pigments and a selective wavelength reflection layer formed on one or both surfaces of the transparent base. The optical filter may satisfy the following conditions (A) and (B) in the case of measuring a transmittance spectrum using a spectrophotometer in the wavelength range of 380 nm to 1,200 nm:

(A) In the wavelength range of 430 nm to 565 nm, an average transmittance for light incident on the optical filter at incident angles of 0° and 30° is 86% or more; and (B) In the wavelength range of 800 nm to 1,100 nm, the maximum transmittance for light incident on the optical filter at incident angles of 0 and 30° is 0.5% or less.

The optical filter according to the present invention includes an optical article containing first and second pigments having absorption maximums in the wavelength range of 650 nm to 750 nm and the wavelength range of 980 nm to 1,200 nm, respectively, such that light incident on the optical filter may show a transmittance of 86% or more, 87% or more, 88% or more, and 89% or more in the wavelength range of about 430 nm to 565 nm, which is the visible light region, at each of incident angles of 0° and 30°. The optical filter may suppress the maximum transmittance to 0.5% or less, 0.4% or less, or 0.3% or less in the near-infrared wavelength range of about 800 nm to 1,100 nm at each of incident angles of 0° and 30°. As an example, when a transmission spectrum of the optical filter for light having incident angles of 0° and 30° is measured in the wavelength range of 300 nm to 1,200 nm using a spectrophotometer, the average transmittance in the wavelength range of 430 nm to 565 nm and the maximum transmittance in the wavelength range of 800 nm to 1,100 nm are respectively 86% or more and 0.3% or less, 87% or more and 0.3% or less, 88% or more and 0.3% or less, or 89% or more and 0.5% or less such that the conditions (A) and (B) may be satisfied. More preferably, since it is possible to simultaneously provide high average transmittance in the visible light region and low maximum transmittance in the near-infrared region, the average transmittance in the wavelength range of 430 nm to 565 nm and the maximum transmittance in the wavelength range of 800 nm to 1,100 nm are respectively 88% or more and 0.3% or less at each of incident angles of 0° and 30° such that the conditions (A) and (B) may be satisfied.

This means that since the optical filter according to the present invention includes the optical article, it exhibits high transmittance for light having a wavelength in the visible light region and thus makes it possible to acquire a high-resolution image even in a dark imaging environment with low illumination or it is possible to replay an imaging subject affected by a light source or lighting which emits rays of light in the near-infrared region at a similar level to that visually recognized by humans by almost completely suppressing a transmittance for light in the wavelength range of 800 nm to 1,100 nm to 0.5% or less, that is, it is possible to provide a flare-suppressed image. Also, this means that high average transmittance for visible light and low maximum transmittance for near-infrared light are provided at each of incident angles of 0° and 30° and thus it is possible to increase the angle of view of an imaging device.

Figure 2A:
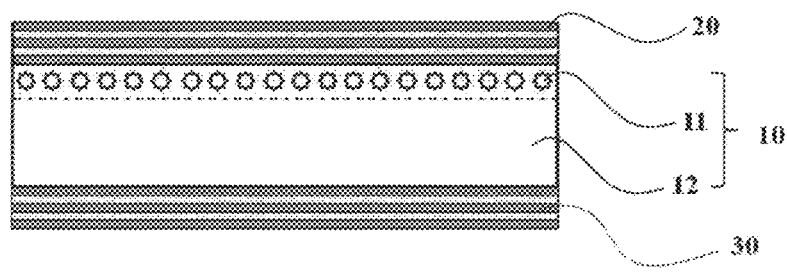
FIG. 2A to FIG. 2C is a set of cross-sectional views of an optical filter according to another embodiment of the present invention.
Figure 2B:
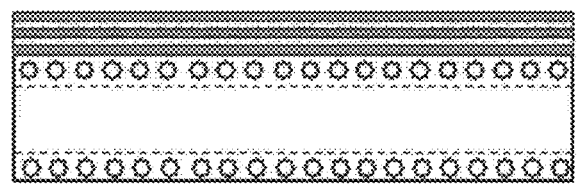
Figure 2C:
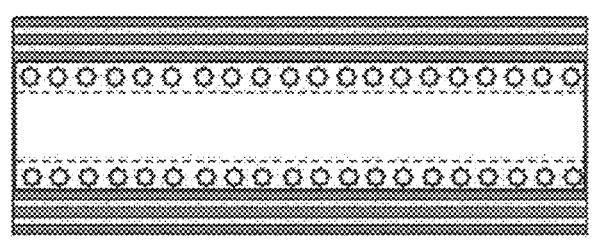

FIG. 2A to FIG. 2C is a set of cross-sectional views showing a structure of an optical filter according to an embodiment of the present invention. Referring to FIG. 2A to FIG. 2C, the optical filter according to the present invention may have a structure including a transparent base 10 including near-infrared absorbing pigments 11 and a base layer 12 and a selective wavelength reflection layer 20 and/or 30 positioned on one surface and/or both surfaces of the transparent base.

Hereinafter, each element of the optical filter according to the present invention will be described in further detail with reference to FIG. 2A to FIG. 2C.

First, in an optical filter according to the present invention, the transparent base 10 including the base layer 12 serves as a base substrate of the optical filter. The transparent base 10, that is, an optical article, includes one or more near-infrared absorbing pigments and thus can have two or more absorption peaks which have the absorption maximums in the wavelength range of 650 nm to 750 nm and the wavelength range of 980 nm to 1,200 nm, respectively. The absorption peaks may include first and second absorption peaks. When an OD value OD1 at the absorption maximum of the first absorption peak is normalized to 1, an OD value OD2 at the absorption maximum of the second absorption peak may be greater than or equal to 0.08 and less than or equal to 0.25. Specifically, Expression 1 may be satisfied when $0.09 \leq OD2 \leq 0.17$, $0.13 \leq OD2 \leq 0.17$, $0.08 \leq OD2 \leq 0.18$, $0.15 \leq OD2 \leq 0.175$, $0.09 \leq OD2 \leq 0.13$, $0.16 \leq OD2 \leq 0.24$, $0.15 \leq OD2 \leq 0.25$, or $0.16 \leq OD2 \leq 0.235$. Preferably, Expression 1 may be satisfied when the OD value OD2 at the absorption maximum of the second absorption peak is greater than or equal to 0.13 and less than or equal to 0.18. Under the above condition, light having a wavelength of 700 nm or more, specifically, a wavelength in the range of 800 nm to 1,200 nm, may be selectively and/or effectively absorbed among incident light, and high transmittance may be provided for light in the visible light region.

In the optical filter according to the present invention, the selective wavelength reflection layers 20 and 30 serve to reflect light having a wavelength of 650 nm or more, specifically, a wavelength in the range of 700 nm to 1,200 nm among light incident on the optical filter to prevent the light in the above range from being incident on an image sensor or to prevent reflection of light in the visible light region having a wavelength range of 400 nm to 650 nm. In other words, the selective wavelength reflection layers 20 and 30 may serve as near-infrared reflective (IR) layers which reflect near-infrared light and/or anti-reflection (AR) layers which prevent reflection of visible light.

The selective wavelength reflection layers 20 and 30 may have a structure such as a dielectric multilayer film formed by alternately stacking a high refractive index layer and a low refractive index layer and may further include an aluminum-deposited film, a noble metal thin film, or a resin film in which one or more types of particles of indium oxide and tin oxide are distributed. For example, the selective wavelength reflection layers 20 and 30 may have a structure in which a dielectric layer (not shown) having a first refractive index and a dielectric layer (not shown) having a second refractive index are alternately stacked, and the refractive index difference between the dielectric layer having the first refractive index and the dielectric layer having the second refractive index may be 0.2 or more, 0.3 or more, or 0.2 to 1.0.

As the high refractive index layer and the low refractive index layer of the selective wavelength reflection layers 20 and 30, any layers which have the refractive index difference between the high refractive index layer and the low refractive index layer in the above-described range may be used without specific limitation. Specifically, the high refractive index layer may include one or more selected from the group consisting of titanium oxide, aluminum oxide, zirconium oxide, tantalum pentoxide, niobium pentoxide, lanthanum oxide, yttrium oxide, zinc oxide, zinc sulfide, and indium oxide, each having a refractive index of 1.6 to 2.4, and the indium oxide may further include a small amount of titanium oxide, tin oxide, cerium oxide, or the like. Also, the low refractive index layer may include one or more selected from the group consisting of silicon dioxide, lanthanum fluoride, magnesium fluoride, and sodium aluminum fluoride (cryolite, $Na_3AlF_6$) each having a refractive index of 1.3 to 1.6.

Further, the selective wavelength reflection layers 20 and 30 may be formed on one surface of the transparent base 10. In some cases, the first and second selective wavelength reflection layers 20 and 30 are formed on both surfaces of the transparent base 10, and thus it is possible to have a structure in which the first selective wavelength reflection layer is positioned on a first main surface of the transparent base 10 and the second selective wavelength reflection layer is positioned on a second main surface of the transparent base 10.

In one embodiment, when the selective wavelength reflection layer includes the first and second selective wavelength reflection layers 20 and 30, the thickness of each of the selective wavelength reflection layers 20 and 30 may satisfy Expression 3 below:

$$0.8 \leq D1/D2 < 1.2 \qquad \text{[Expression 3]}$$

In Expression 3,

D1 represents the thickness of the first selective wavelength reflection layer, and D2 represents the thickness of the second selective wavelength reflection layer.

Specifically, a thickness ratio of the first and second selective wavelength reflection layers 20 and 30 may be 0.8 to 1.2, 0.8 to 1.0, 0.9 to 1.1, 1.0 to 1.2, 0.85 to 1.0, or 1.1 to 1.2, which satisfies Expression 3.

As another example, when the selective wavelength reflection layer includes the first and second selective wavelength reflection layers 20 and 30, each of the selective wavelength reflection layers 20 and 30 may have a dielectric multilayer film structure, and Expression 4 may be satisfied:

$$0 \leq |P1 - P2| < 6 \qquad \text{[Expression 4]}$$

In Expression 4,

P1 represents the number of stacked layers of the dielectric multilayer film constituting the first selective wavelength reflection layer, and P2 represents the number of stacked layers of the dielectric multilayer film constituting the second selective wavelength reflection layer.

Specifically, the first and second selective wavelength reflection layers 20 and 30 may have a dielectric multilayer film structure having 30 layers or less, 29 layers or less, 28 layers or less, 27 layers or less, 26 layers or less, or 25 layers or less. In this case, when a difference in the number of layers is less than 6 layers, 1 layer to 5 layers, 2 layers to 5 layers, 3 layers to 5 layers, 1 layer to 3 layers, 0 layers to 3 layers, or 2 layers to 4 layers, Expression 4 may be satisfied.

Since the present invention can reduce warpage occurring in optical filter fabrication by controlling the difference in the number of stacked layers and the thickness ratio between the first and second selective wavelength reflection layers 20 and 30 to be in the above ranges, an imaging device including the optical filter can prevent an assembly defect caused by the warpage of the optical filter.

In a conventional optical filter, a near-infrared reflection layer having a dielectric multilayer film structure is thickly formed such that light having a wavelength of 700 nm or more may be blocked. However, the conventional optical filter has insufficient performance in blocking light in the range of 800 nm to 1,200 nm. Also, lens flare occurs, or it is not possible to miniaturize an imaging device including the conventional optical filter due to difficulty in reducing the thickness of the optical filter. However, the optical filter according to the present invention includes the transparent base 10 including the base layer 12 and the two or more kinds of near-infrared absorbing pigments 11 which absorb near-infrared light, that is, an optical article according to the present invention and thus can effectively block light having a wavelength of 800 nm or more. Therefore, lens flare lessens, and it is easy to fabricate the optical filter 10 to be thinner by reducing the number of layers and the thickness of the selective wavelength reflection layers 20 and 30 ranges to the above ranges. Moreover, warpage of the optical filter which may occur in optical filter fabrication can be reduced by controlling the number of stacked layers and the thickness of a selective wavelength reflection layer.

<Solid-State Imaging Device>

Further, an imaging device including the optical filter is provided in an embodiment of the present invention.

The imaging device according to the present invention includes the optical filter of the present invention including the optical article which contains a first pigment having the absorption maximum in the wavelength range of 650 nm to 750 nm and a second pigment having the absorption maximum in the wavelength range of 950 nm to 1,200 nm. The imaging device exhibits a high transmittance of 86% or more for light having a wavelength in the visible light region and can suppress a transmittance for light in the wavelength range of 800 nm to 1,100 nm to 0.5% or less. Therefore, the imaging device can provide a high-resolution image even in a dark environment with low illumination, suppress lens flare in the case of imaging a subject which emits infrared light or near-infrared light or is exposed to the emitted light, and reduce the thickness of a selective wavelength reflection layer provided in the optical filter. Accordingly, it is possible to fabricate the optical filter to be thinner and miniaturize the imaging device. Also, since warpage occurring in optical filter fabrication is reduced, an assembly defect rate in an assembly process may be reduced, leading to improvement in yield and productivity.

Therefore, the solid-state imaging element may be effectively used in electronic devices to which a solid-state imaging device is applied, for example, a digital still camera, a camera for a mobile phone, a digital video camera, a personal computer (PC) camera, a surveillance camera, a vehicular camera, a portable information terminal, a PC, a video game, a medical device, a universal serial bus (USB) memory, a portable game machine, a fingerprint identification system, a digital music player, and the like.

Hereinafter, the present invention will be described in further detail with reference to fabrication examples, examples, and experimental examples.

However, the following fabrication examples, examples, and experimental examples are merely provided to exemplify the present invention, and the present invention is not limited to the following fabrication examples, examples, and experimental examples.

Fabrication Examples 1 to 4

According to a fabrication example of the present invention, an optical article having first absorption peak and second absorption peak was prepared as follows.

A near-infrared absorbing pigment A (QCR Solutions Corp., US) represented as Formula 1 and having the absorption maximum in the wavelength range of 700±5 nm, a near-infrared absorbing pigment B (QCR Solutions Corp., US) represented as Formula 1 and having the absorption maximum in the wavelength range of 720±5 nm, and a near-infrared absorbing pigment C (Carlit Co., Ltd., Japan) represented as Formula 2 and having the absorption maximum in the wavelength range of 1,097±5 nm were mixed as contents shown in Table 1 below on the basis of 100 parts by weight of a resin. At this time, a polymethylmethacrylate (PMMA) resin was used as the resin, and cyclohexanone was used as an organic solvent. Afterward, the resulting mixture was stirred using a stirrer for 24 hours or more such that an absorbing solution was prepared. The prepared absorbing solution was applied to both surfaces of a PET film (A4100, fabricated by Toyobo Co., Ltd.) having a thickness of 0.1 mm, cured at 120° C. for 50 minutes such that an optical article having near-infrared absorbing layers on both surfaces thereof as shown in FIG. 1B was fabricated. At this time, a mass ratio between the near-infrared absorbing pigments A and B was adjusted to be 1:1.

TABLE 1

| | First absorption peak | | | Second absorption peak | | |
|---|---|---|---|---|---|---|
| | Pigment name | Content | OD1 | Pigment name | Content | OD2 |
| Fabrication Example 1 | A + B | 1.0 part by weight | 1.00 | C | 0.21 parts by weight | 0.25 |
| Fabrication Example 2 | A + B | 1.0 part by weight | 1.00 | C | 0.16 parts by weight | 0.18 |
| Fabrication Example 3 | A + B | 1.0 part by weight | 1.00 | C | 0.11 parts by weight | 0.13 |
| Fabrication Example 4 | A + B | 1.0 part by weight | 1.00 | C | 0.07 parts by weight | 0.08 |

To evaluate an OD of each of the optical articles fabricated according to Fabrication Examples 1 to 4 according to the present invention, an absorbance spectrum according to a wavelength in the wavelength range of 380 nm to 1,200 nm was measured using a spectrophotometer. An OD at the absorption maximum of a peak having the absorption maximum in the wavelength range of 650 nm to 750 nm (first absorption peak) and an OD at the absorption maximum of a peak having the absorption maximum in the wavelength range of 980 nm to 1,200 nm (second absorption peak) were derived from the OD curve, and an OD value OD2 at the absorption maximum of the second absorption peak was calculated when the OD curve was normalized so that an OD value OD1 at the absorption maximum of the first absorption peak would become 1. The results are shown in Table 1 together. Also, normalized OD curves of each of the optical articles according to the fabrication examples disclosed in Table 1 are shown in FIG. 4. Referring to Table 1 and FIG. 4, it is possible to see that the OD value OD2 ranges from 0.08 to 0.25.

Examples 1 to 7

A first selective wavelength reflection layer having a dielectric multilayer film structure was formed by alternately depositing $SiO_2$ and $Ti_3O_5$ on a first main surface of each of the optical articles prepared in Fabrication Examples 1 to 4 at a temperature of 110±5° C. using an E-beam evaporator. Afterward, a second selective wavelength reflection layer having a dielectric multilayer film structure was formed by alternately depositing $SiO_2$ and $Ti_3O_5$ on a second main surface of each of the optical articles at a temperature of 110±5° C. using an E-beam evaporator such that optical filters having the same structure as shown in FIG. 2C were fabricated. The number of stacked layers and the thickness of each of the first and second selective wavelength reflection layers are shown in Table 2 below. In Table 2, the thickness represents the total thickness of the first or second selective wavelength reflection layer, and the unit is micrometer (μm).

TABLE 2

| Example No. | Used optical article | First selective wavelength reflection layer | | Second selective wavelength reflection layer | | [Expression 3] \|D1/D2\| | [Expression 4] \|P1 − P2\| |
|---|---|---|---|---|---|---|---|
| | | Number of layers [P1] | Thickness [D1] | Number of layers [P2] | Thickness [D2] | | |
| Example 1 | Fabrication Example 1 | 23 | 2.8 | 28 | 3.4 | 0.82 | 5 |
| Example 2 | Fabrication Example 1 | 23 | 2.8 | 26 | 3.1 | 0.90 | 3 |
| Example 3 | Fabrication Example 1 | 28 | 3.5 | 28 | 3.4 | 1.03 | 0 |
| Example 4 | Fabrication Example 1 | 31 | 3.9 | 28 | 3.4 | 1.15 | 3 |
| Example 5 | Fabrication Example 2 | 23 | 2.8 | 26 | 3.1 | 0.90 | 3 |
| Example 6 | Fabrication Example 3 | 23 | 2.8 | 26 | 3.1 | 0.90 | 3 |
| Example 7 | Fabrication Example 4 | 23 | 2.8 | 26 | 3.1 | 0.90 | 3 |

Referring to Table 2, it is possible to see that, in Examples 1 to 7, the |D1/D2| values according to [Expression 3] of this specification are in a range of 0.8 to 1.2, specifically, 0.82 to 1.15. Also, it is possible to see that, in Examples 1 to 7, the |P1−P2| values according to [Expression 4] of this specification are in a range of 0 to 6, specifically, 0 to 5.

The first and second selective wavelength reflection layers may have, for example, a structure in which $SiO_2$ and $Ti_3O_5$ are alternately stacked. The first selective wavelength reflection layer may have a 23- to 31-layer structure and a thickness ranging from 2.8 to 3.9 µm, and the second selective wavelength reflection layer may have a 26- to 28-layer structure and a thickness ranging from 3.1 to 3.4 µm. As an example of the first selective wavelength reflection layer and the second selective wavelength reflection layer of the optical filters, the stacked structure and the thickness of each of the first selective wavelength reflection layer and the second selective wavelength reflection layer applied to Example 1 are shown in Table 3 and Table 4 below.

TABLE 3

| Stacking sequence | Material | Optical thickness1 (QWOT) | Thickness (nm) |
|---|---|---|---|
| 1 | $SiO_2$ | 1.34 | 105.6 |
| 2 | $Ti_3O_5$ | 0.18 | 8.6 |
| 3 | $SiO_2$ | 0.48 | 38.2 |
| 4 | $Ti_3O_5$ | 2.17 | 104.6 |
| 5 | $SiO_2$ | 2.10 | 165.3 |
| 6 | $Ti_3O_5$ | 2.16 | 104.1 |
| 7 | $SiO_2$ | 2.16 | 170.2 |
| 8 | $Ti_3O_5$ | 2.20 | 106.1 |
| 9 | $SiO_2$ | 2.17 | 170.8 |
| 10 | $Ti_3O_5$ | 2.19 | 106.0 |
| 11 | $SiO_2$ | 2.18 | 171.7 |
| 12 | $Ti_3O_5$ | 2.20 | 106.5 |
| 13 | $SiO_2$ | 2.17 | 171.1 |
| 14 | $Ti_3O_5$ | 2.20 | 106.3 |
| 15 | $SiO_2$ | 2.18 | 171.5 |
| 16 | $Ti_3O_5$ | 2.19 | 106.0 |
| 17 | $SiO_2$ | 2.16 | 170.1 |
| 18 | $Ti_3O_5$ | 2.18 | 105.2 |
| 19 | $SiO_2$ | 2.14 | 168.6 |
| 20 | $Ti_3O_5$ | 2.12 | 102.2 |
| 21 | $SiO_2$ | 2.05 | 161.2 |
| 22 | $Ti_3O_5$ | 2.00 | 96.4 |
| 23 | $SiO_2$ | 0.98 | 77.2 |

TABLE 4

| Stacking sequence | Material | Optical thickness (QWOT) | Thickness (nm) |
|---|---|---|---|
| 1 | $SiO_2$ | 0.63 | 88.7 |
| 2 | $Ti_3O_5$ | 1.20 | 107.0 |
| 3 | $SiO_2$ | 1.38 | 194.8 |
| 4 | $Ti_3O_5$ | 1.37 | 122.9 |
| 5 | $SiO_2$ | 1.48 | 208.9 |
| 6 | $Ti_3O_5$ | 0.17 | 15.2 |
| 7 | $SiO_2$ | 0.10 | 14.3 |
| 8 | $Ti_3O_5$ | 1.31 | 116.9 |
| 9 | $SiO_2$ | 1.39 | 197.2 |
| 10 | $Ti_3O_5$ | 1.21 | 108.7 |
| 11 | $SiO_2$ | 1.23 | 173.9 |
| 12 | $Ti_3O_5$ | 1.14 | 102.3 |
| 13 | $SiO_2$ | 1.21 | 170.9 |
| 14 | $Ti_3O_5$ | 1.12 | 100.5 |
| 15 | $SiO_2$ | 1.21 | 170.8 |
| 16 | $Ti_3O_5$ | 1.11 | 99.2 |
| 17 | $SiO_2$ | 1.21 | 171.0 |
| 18 | $Ti_3O_5$ | 1.11 | 99.3 |
| 19 | $SiO_2$ | 1.21 | 170.8 |
| 20 | $Ti_3O_5$ | 1.11 | 99.8 |
| 21 | $SiO_2$ | 1.21 | 171.1 |
| 22 | $Ti_3O_5$ | 1.13 | 101.1 |
| 23 | $SiO_2$ | 1.22 | 172.9 |
| 24 | $Ti_3O_5$ | 1.16 | 103.8 |
| 25 | $SiO_2$ | 1.30 | 183.4 |
| 26 | $Ti_3O_5$ | 1.28 | 114.5 |
| 27 | $SiO_2$ | 0.28 | 39.9 |
| 28 | $Ti_3O_5$ | 0.11 | 9.8 |

Also, the spectral transmittance of the first selective wavelength reflection layer disclosed in Table 3 is shown in FIG. 5, and that of the second selective wavelength reflection layer disclosed in Table 4 is shown in FIG. 6.

Comparative Fabrication Examples 1 to 3

Optical articles according to Comparative Fabrication Examples 1 to 3 were prepared in substantially the same manner as described in Fabrication Examples 1 to 4 excluding content of the near-infrared absorbing pigment C having the absorption maximum in the wavelength range of 1,097±5 nm. The content of the near-infrared absorbing pigment C is shown in Table 5 below.

TABLE 5

| | First absorption peak | | | Second absorption peak | | |
|---|---|---|---|---|---|---|
| | Pigment name | Content | OD1 | Pigment name | Content | OD2 |
| Comparative Example 1 | A + B | 1.0 part by weight | 1.00 | C | 0.00 parts by weight | 0.00 |
| Comparative Example 2 | A + B | 1.0 part by weight | 1.00 | C | 0.24 parts by weight | 0.28 |
| Comparative Example 3 | A + B | 1.0 part by weight | 1.00 | C | 0.04 parts by weight | 0.05 |

OD values of the optical articles according to Comparative Fabrication Examples 1 to 3 were calculated using substantially the same method as the above-described method of measuring an OD of the optical articles according to Fabrication Examples 1 to 4. The results are shown in Table 5 together. Moreover, normalized OD curves of each of the optical articles according to Comparative Fabrication Examples 1 to 3 disclosed in Table 5 are shown in FIG. 4 together. Referring to Table 5 and FIG. 4, it is possible to see that the OD value OD2 deviates from a range of 0.08 to 0.25.

Comparative Examples 1 to 6

A first selective wavelength reflection layer having a dielectric multilayer film structure was formed by alternately depositing $SiO_2$ and $Ti_3O_5$ on a first main surface of each of the optical articles prepared in Comparative Fabrication Examples 1 to 3 at a temperature of 110±5° C. using an E-beam evaporator. Afterward, a second selective wavelength reflection layer having a dielectric multilayer film structure was formed by alternately depositing $SiO_2$ and $Ti_3O_5$ on a second main surface of each of the optical articles at a temperature of 110±5° C. using an E-beam evaporator such that optical filters having the same structure as shown in FIG. 2C were fabricated. The number of stacked layers and the thickness of each of the first and second selective wavelength reflection layers formed on the optical filters are shown in Table 6 below. In Table 6, the thickness represents the total thickness of the first or second selective wavelength reflection layer, and the unit is micrometers (μm).

Transmittances for visible light and near-infrared light according to an incident angle were inferred by measuring transmittances for light having an incident angle of 0° and light having an incident angle of 30°. The results are shown in Table 7 and FIGS. 7 to 10. In Table 7, an average transmittance for visible light refers to an average transmittance calculated in the wavelength range of 430 nm to 565 nm, the maximum transmittance for near-infrared light refers to the maximum transmittance calculated in the wavelength range of 800 nm to 1,100 nm, and an average transmittance for near-infrared light refers to an average transmittance in the wavelength range of 800 nm to 1,100 nm.

Also, Table 7 shows an OD value OD2 for each of the optical articles used in Examples 2, 5 to 7 and Comparative Examples 4 to 6 together.

TABLE 6

| Comparative Example No. | Used optical article | First selective wavelength reflection layer | | Second selective wavelength reflection layer | | [Expression 3] \|D1/D2\| | [Expression 4] \|P1 − P2\| |
|---|---|---|---|---|---|---|---|
| | | Number of layers [P1] | Thickness [D1] | Number of layers [P2] | Thickness [D2] | | |
| Comparative Example 1 | Comparative Fabrication Example 1 | 23 | 2.8 | 30 | 3.6 | 0.78 | 7 |
| Comparative Example 2 | Comparative Fabrication Example 1 | 23 | 2.8 | 32 | 3.8 | 0.74 | 9 |
| Comparative Example 3 | Comparative Fabrication Example 1 | 31 | 3.9 | 26 | 3.1 | 1.26 | 5 |
| Comparative Example 4 | Comparative Fabrication Example 1 | 23 | 2.8 | 26 | 3.1 | 0.90 | 3 |
| Comparative Example 5 | Comparative Fabrication Example 2 | 23 | 2.8 | 26 | 3.1 | 0.90 | 3 |
| Comparative Example 6 | Comparative Fabrication Example 3 | 23 | 2.8 | 26 | 3.1 | 0.90 | 3 |

Referring to Table 6, it is possible to see that, in Comparative Examples 1 to 3, the |D1/D2| values according to [Expression 3] of this specification deviate from a range of 0.8 to 1.2. Also, it is possible to see that, in Comparative Examples 1 and 2, the |P1−P2| values according to [Expression 4] of this specification deviate from a range of 0 to 6.

Experimental Example 1

To evaluate transmittance according to an incident angle of an optical filter of the present invention, an experiment was performed as follows.

A transmission spectrum of each of the optical filters fabricated in Examples 2, 5 to 7 and Comparative Examples 4 to 6 was measured using a spectrophotometer in the wavelength range of 380 nm to 1,200 nm.

TABLE 7

| | | | Incident angle 0° | | | Incident angle 30° | | |
|---|---|---|---|---|---|---|---|---|
| Optical filter | Used optical article | OD2 | Average transmittance for visible light [%] | Maximum transmittance for near-infrared light [%] | Average transmittance for near-infrared light [%] | Average transmittance for visible light [%] | Maximum transmittance for near-infrared light [%] | Average transmittance for near-infrared light [%] |
| Example 2 | Fabrication Example 1 | 0.25 | 87.23 | 0.11 | 0.02 | 86.04 | 0.23 | 0.04 |
| Example 5 | Fabrication Example 2 | 0.18 | 88.59 | 0.12 | 0.02 | 87.15 | 0.26 | 0.05 |
| Example 6 | Fabrication Example 3 | 0.13 | 89.73 | 0.14 | 0.02 | 88.34 | 0.29 | 0.06 |
| Example 7 | Fabrication Example 4 | 0.08 | 90.84 | 0.15 | 0.03 | 89.49 | 0.41 | 0.07 |
| Comparative Example 4 | Comparative Fabrication Example 1 | 0.00 | 92.67 | 0.18 | 0.04 | 91.40 | 0.71 | 0.10 |

TABLE 7-continued

|  |  |  | Incident angle 0° | | | Incident angle 30° | | |
| --- | --- | --- | --- | --- | --- | --- | --- | --- |
| Optical filter | Used optical article | OD 2 | Average transmittance for visible light [%] | Maximum transmittance for near-infrared light [%] | Average transmittance for near-infrared light [%] | Average transmittance for visible light [%] | Maximum transmittance for near-infrared light [%] | Average transmittance for near-infrared light [%] |
| Comparative Example 5 | Comparative Fabrication Example 2 | 0.28 | 86.45 | 0.10 | 0.02 | 84.93 | 0.22 | 0.03 |
| Comparative Example 6 | Comparative Fabrication Example 3 | 0.05 | 91.72 | 0.17 | 0.03 | 90.41 | 0.53 | 0.08 |

As shown in Table 7 and FIGS. 7 to 10, it is possible to see that the optical filters according to the present invention have high transmittances of 86% or more for light in the visible light region and effectively block light having a wavelength of 800 nm or more, which may affect lens flare, such that the maximum transmittance for the light may become 0.5% or less.

Specifically, referring to Table 7, when light in the wavelength range of 800 nm to 1,100 nm is incident, all of the optical filters fabricated in Examples 2 and 5 to 7 exhibited near-infrared maximum transmittances of 0.2% or less and 0.5% or less at incident angles of 0° and 30°, respectively. In other words, the optical filters exhibited very low near-infrared maximum transmittances of 0.5% or less regardless of incident angle. On the contrary, the optical filter of Comparative Example 4 employing an optical article having an OD value OD2 of 0.00 and the optical filter of Comparative Example 6 employing an optical article having an OD value OD2 of 0.05 had maximum transmittances of more than 0.5% for light incident at an angle of 30°. When the maximum transmittance exceeds 0.5%, there is a high likelihood that lens flare occurs in the case of taking an image of a subject which emits infrared light or near-infrared light or a subject exposed to infrared light or near-infrared light.

Referring to Table 7 and FIGS. 7 to 10 together, when visible light in the wavelength range of 430 nm to 565 nm is incident, the optical filters fabricated in Examples 2 and 5 to 7 exhibited average transmittances of 87% or more and 86% or more at incident angles of 0° and 30°, respectively. In other words, all the optical filters exhibited average transmittances of 86% or more for visible light regardless of incident angle. On the contrary, the optical filter of Comparative Example 5 employing an optical article having an OD value OD2 of 0.28 had an average transmittance of less than 85% for visible light incident at an angle of 30°. When the transmittance in the visible light region is 86% or less, it is difficult to ensure sufficient resolution power to identify a subject in the case of capturing an image in a dark environment with low illumination.

From the above results, it is possible to see that the optical filters according to the present invention can have an excellent transmittance for light in the visible light region and effectively block light having a wavelength of 800 nm or more.

Also, it is possible to see that the optical filters having an OD value OD2 ranging from 0.08 to 0.25 according to the present invention provide excellent performance in blocking light having a wavelength of 800 nm or more as well as high transmittance for visible light.

Experimental Example 2

To evaluate the degree of warpage of an optical filter according to the present invention, an experiment was performed as follows.

The degree of warpage and the warpage direction of the optical filters (width 3 mm×length 3 mm) fabricated in Example 1 to 4 and Comparative Examples 1 to 3 were measured using an ultra-accuracy 3D profilometer (UA3P-300, Panasonic Corp.). Specifically, a first selective wavelength reflection layer of each optical filter was fixed to be in contact with a horizontal surface of the profilometer, and the heights of points present on the surface of the optical filter were measured on the basis of the horizontal surface. At this time, the temperature of a chamber in which the optical filter was fixed was 23° C., a relative humidity was 60%, and a vibration acceleration was 0.5 cm/s$^2$. The measurement results are shown in Table 8 below.

TABLE 8

| Optical filter | D1/D2 | |P1 − P2| | Degree of warpage (μm) | Assembly defect rate (%) |
| --- | --- | --- | --- | --- |
| Example 1 | 0.82 | 5 | 6.3 | 0 |
| Example 2 | 0.90 | 3 | 3.5 | 0 |
| Example 3 | 1.03 | 0 | 0.3 | 0 |
| Example 4 | 1.15 | 3 | −4.0 | 0 |
| Comparative Example 1 | 0.78 | 7 | 9.0 | 2 |
| Comparative Example 2 | 0.74 | 9 | 13.5 | 6 |
| Comparative Example 3 | 1.26 | 5 | −7.7 | 2 |

Referring to Table 8, it is possible to see that the optical filters according to the present invention can reduce warpage by controlling the number of stacked layers and the thickness of the selective wavelength reflection layer.

Specifically, the optical filters of Examples 1 to 4, in which a difference (|P1−P2|) in the number of stacked layers between the first and second selective wavelength reflection layers formed on the surface of the optical article was less than 6 and a thickness ratio (D1/D2) was equal to or greater than 0.8 and less than 1.2, exhibited the degree of warpage of about 6.3 μm or less regardless of direction.

On the contrary, the optical filters of Comparative Examples 1 to 3, in which a difference (|P1−P2|) in the number of stacked layers between the first and second selective wavelength reflection layers exceeded 6 and a thickness ratio (D1/D2) was less than 0.8 or exceeded 1.2, exhibited the degree of warpage of more than 7 μm.

Also, Table 8 shows assembly defect rates in an assembly process when the optical filters (width 5.7 mm×length 4.6 mm) fabricated in Example 1 to 4 and Comparative Examples 1 to 3 were installed in an imaging device. When the degree of warpage exceeds 7 μm as a result of measuring the degree of warpage shown in FIG. 8, it is possible to see that a defect rate is increased in the assembly process. Such a result represents that it is possible to reduce warpage of the optical filter by adjusting the difference in the number of stacked layers and the thickness ratio between the first and second selective wavelength reflection layers formed on the optical article and to improve yield and productivity by reducing an assembly defect rate in the process of assembling an imaging device.

Experimental Example 3

To evaluate the image quality of an optical filter according to the present invention, an experiment was performed as follows.

Figure 11A:
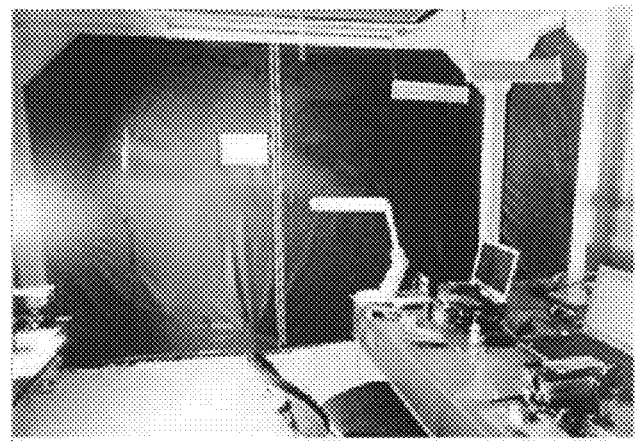
Figure 11B:
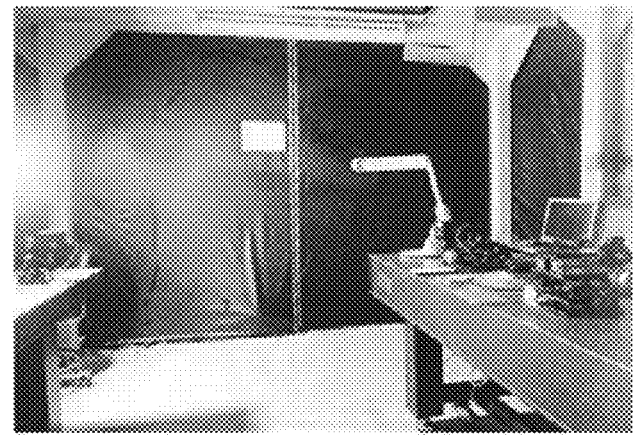
Figure 11C:
Figure 11D:
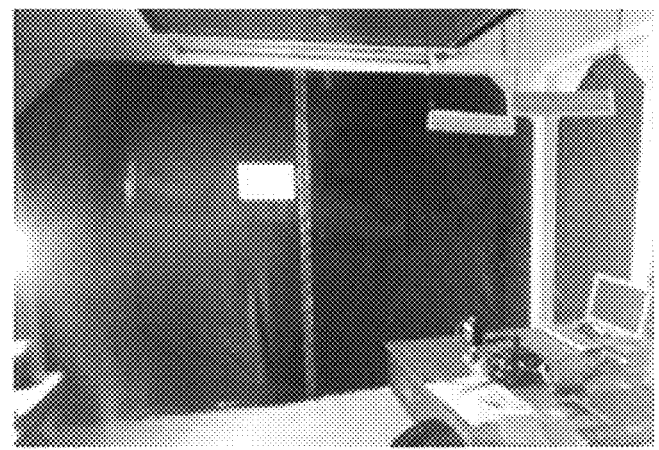

An image was captured using an imaging device manufactured with a camera module equipped with the optical filter according to Example 5 of the present invention. Also, for comparative evaluation of image quality, images were captured using the imaging device in which the optical filter was replaced with the optical filters of Example 7 and Comparative Examples 4 and 6 according to the present invention while the lens and the image sensor were left as they were. Images of a halogen lamp and a subject exposed to the halogen lamp are shown in FIG. 11A to FIG. 11D. FIGS. 11C and 11D show images captured by the imaging device equipped with the optical filters of Comparative Examples 4 and 6, respectively. In FIGS. 11C and 11D, it is possible to see strong purplish flares on both the left and right sides of the images. In particular, it is possible to see that when the optical filter of Comparative Example 4 including an optical article having an OD2 value of 0.00 was installed, a strong purplish flare was all over the image. On the other hand, referring to FIGS. 11A and 11B, it is possible to see that no flare occurs in images captured by the imaging device equipped with the optical filters of Examples 5 and 7 according to the present invention.

Therefore, an optical filter according to the present invention may exhibit high transmittance for light having a wavelength in the visible light region to provide high resolution power even in a low-illumination environment and may prevent lens flare by suppressing a transmittance for light having a wavelength range of 800 nm to 1,100 nm to 0.5% or less. Also, since warpage of the optical filter may be remarkably reduced by controlling the number of stacked layers and the thickness of a selective wavelength reflection layer, it is possible to considerably reduce an assembly defect rate caused by the warpage of the optical filter in the process of assembling an imaging device.

The invention claimed:
1. An optical article comprising:
a transparent base containing two or more kinds of near-infrared absorbing pigments;
an absorbance spectrum measured using a spectrophotometer in a wavelength range of 380 nm to 1,200 nm, which has two or more absorption peaks including first and second absorption peaks,
wherein the first absorption peak has an absorption maximum λmax1 in a wavelength range of 650 nm to 750 nm,
wherein the second absorption peak has an absorption maximum λmax2 in a wavelength range of 980 nm to 1,200 nm; and
when an optical density (OD) value OD1 at the absorption maximum of the first absorption peak is normalized to 1, an OD value OD2 at the absorption maximum of the second absorption peak satisfies Expression 1 below:

$$0.08 \leq OD2 \leq 0.25;$$ [Expression 1]

wherein the optical article includes:
a first selective wavelength reflection layer formed on a first main surface of the transparent base; and
a second selective wavelength reflection layer formed on a second main surface of the transparent base, and
Expression 3 below is satisfied:

$$0.8 \leq D1/D2 < 1.2$$ [Expression 3]

where D1 represents a thickness of the first selective wavelength reflection layer, and D2 represents a thickness of the second selective wavelength reflection layer; and
wherein the first and second selective wavelength reflection layers are each independently formed of a dielectric multilayer film, and Expression 4 below is satisfied:

$$0 \leq |P1-P2| < 6$$ [Expression 4]

where P1 represents the number of stacked layers of the dielectric multilayer film constituting the first selective wavelength reflection layer, and P2 represents the number of stacked layers of the dielectric multilayer film constituting the second selective wavelength reflection layer.

2. The optical article of claim 1, wherein the OD value OD2 at the absorption maximum of the second absorption peak satisfies Expression 2 below:

$$0.13 \leq OD2 \leq 0.18.$$ [Expression 2]

3. The optical article of claim 1, wherein the transparent base includes at least one of glass and a polymer resin.

4. The optical article of claim 3, wherein the polymer resin includes one or more selected from the group consisting of a polyester-based resin, a polycarbonate-based resin, an acryl-based resin, a polyolefin-based resin, a cyclic olefin-based resin, a polyimide-based resin, a polyamide-based resin, and a polyurethane-based resin.

5. The optical article of claim 1, wherein the near-infrared absorbing pigments include:
a first pigment having an absorption maximum in a range of 650 nm to 750 nm; and
a second pigment having an absorption maximum in a range of 980 nm to 1,200 nm.

6. The optical article of claim 1, wherein the near-infrared absorbing pigments include at least one of compounds represented by Formulas 1 and 2 below:

[Formula 1]

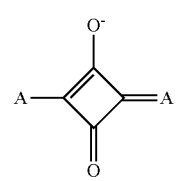

[Formula 2]

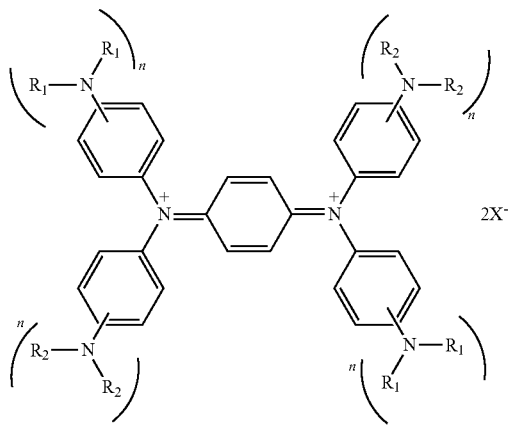

where A is an aminophenyl group, an indolylmethylene group, or an indolinyl group, and two As are conjugated with each other with

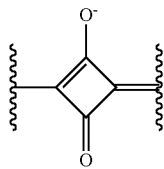 [SMILES: *C1=C([O-])C(=*)C1=O]

at a center thereof, any one or more of hydrogens present in the aminophenyl group, indolylmethylene group, or indolinyl group are each independently hydrogen, a halogen group, a hydroxyl group, a cyano group, a nitro group, a carboxyl group, an alkyl group having 1 to 20 carbon atoms, a cycloalkyl group having 3 to 20 carbon atoms, an alkoxy group having 1 to 10 carbon atoms, an aralkyl group having 7 to 20 carbon atoms, a sulfonamide group, or an amide group unsubstituted or substituted with an alkyl group having 1 to 4 carbon atoms, a haloalkyl group having 1 to 4 carbon atoms, or an aralkyl group having 7 to 20 carbon atoms, $R_1$ and $R_2$ are each independently an alkyl group having 1 to 20 carbon atoms or a cycloalkyl group having 3 to 20 carbon atoms, n is 1 or 2, and $X^-$ is perchlorate ($ClO_4^-$), hexafluoroantimonate ($SbF_6^-$), hexafluorophosphate ($PF_6^-$), tetrafluoroborate ($BF_4^-$), or any one of anions represented by Formulas 2A to 2C below:

[Formula 2A]

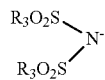

[Formula 2B]

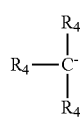

[Formula 2C]

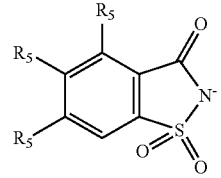

where $R_3$ are each independently a monofluoroalkyl group having 1 to 8 carbon atoms or a trifluoroalkyl group having 1 to 8 carbon atoms, $R_4$ are each independently hydrogen, a nitro group, or a cyano group, and $R_5$ are each independently an alkyl group having 1 to 20 carbon atoms, a monofluoroalkyl group having 1 to 8 carbon atoms, or a trifluoroalkyl group having 1 to 8 carbon atoms.

7. The optical article of claim 1, wherein the transparent base comprises:
a base layer; and
a near-infrared absorbing layer configured to be formed on one surface or both surfaces of the base layer and contain a near-infrared absorbing pigment.

8. The optical article of claim 1, wherein the transparent base comprises:
a base layer; and
a near-infrared absorbing pigment distributed in the base layer.

9. An optical filter including the optical article of claim 1.

10. An optical filter comprising:
a transparent base containing two or more kinds of near-infrared absorbing pigments;
and a selective wavelength reflection layer formed on one surface or both surfaces of the transparent base,
when a transmission spectrum is measured in a wavelength range of 380 nm to 1,200 nm using a spectrophotometer, conditions (A) and (B) are satisfied:
(A) an average transmittance for light incident on the optical filter at incident angles of 0° and 30° is 86% or more in a wavelength range of 430 nm to 565 nm, and
(B) a maximum transmittance for light incident on the optical filter at incident angles of 0° and 30° is 0.5% or less in a wavelength range of 800 nm to 1,100 nm;
wherein the optical article includes:
a first selective wavelength reflection layer formed on a first main surface of the transparent base; and
a second selective wavelength reflection layer formed on a second main surface of the transparent base, and
Expression 3 below is satisfied:

$$0.8 \leq D1/D2 < 1.2 \qquad \text{[Expression 3]}$$

where D1 represents a thickness of the first selective wavelength reflection layer, and D2 represents a thickness of the second selective wavelength reflection layer; and wherein the first and second selective wavelength reflection layers are each independently formed of a dielectric multilayer film, and Expression 4 below is satisfied:

$$0 \leq |P1-P2| < 6 \qquad \text{[Expression 4]}$$

where P1 represents the number of stacked layers of the dielectric multilayer film constituting the first selective wavelength reflection layer, and P2 represents the number of stacked layers of the dielectric multilayer film constituting the second selective wavelength reflection layer.

11. The optical filter of claim 10, wherein an absorbance spectrum of the transparent base measured using a spectrophotometer in the wavelength range of 380 nm to 1,200 nm has two or more absorption peaks including a first and a second absorption peaks, the first absorption peak has an absorption maximum λmax1 in a wavelength range of 650 nm to 750 nm, the second absorption peak has an absorption maximum λmax2 in a wavelength range of 980 nm to 1,200 nm, and when an optical density (OD) value OD1 at the absorption maximum of the first absorption peak is normalized to 1, an OD value OD2 at the absorption maximum of the second absorption peak satisfies Expression 1 below:

$0.08 \leq OD2 \leq 0.25.$ [Expression 1]

12. The optical filter of claim 11, wherein the OD value OD2 at the absorption maximum of the second absorption peak satisfies Expression 2 below:

$0.13 \leq OD2 \leq 0.18.$ [Expression 2]

13. A solid-state imaging device including the optical filter of claim 10.

* * * * *